May 2, 1939. S. B. FIELD ET AL 2,156,892
METHOD OF AND MACHINE FOR SEALING CAPPED CONTAINERS
Filed Nov. 14, 1936 10 Sheets-Sheet 2
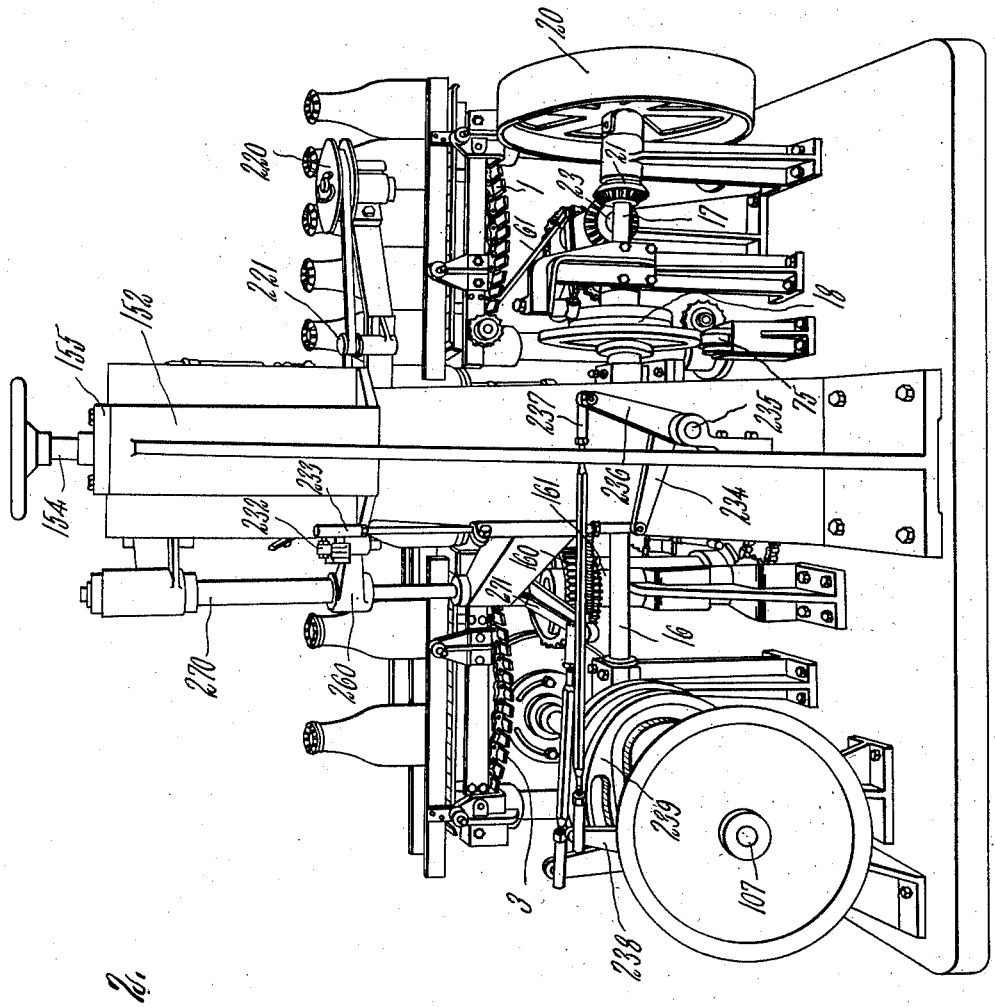

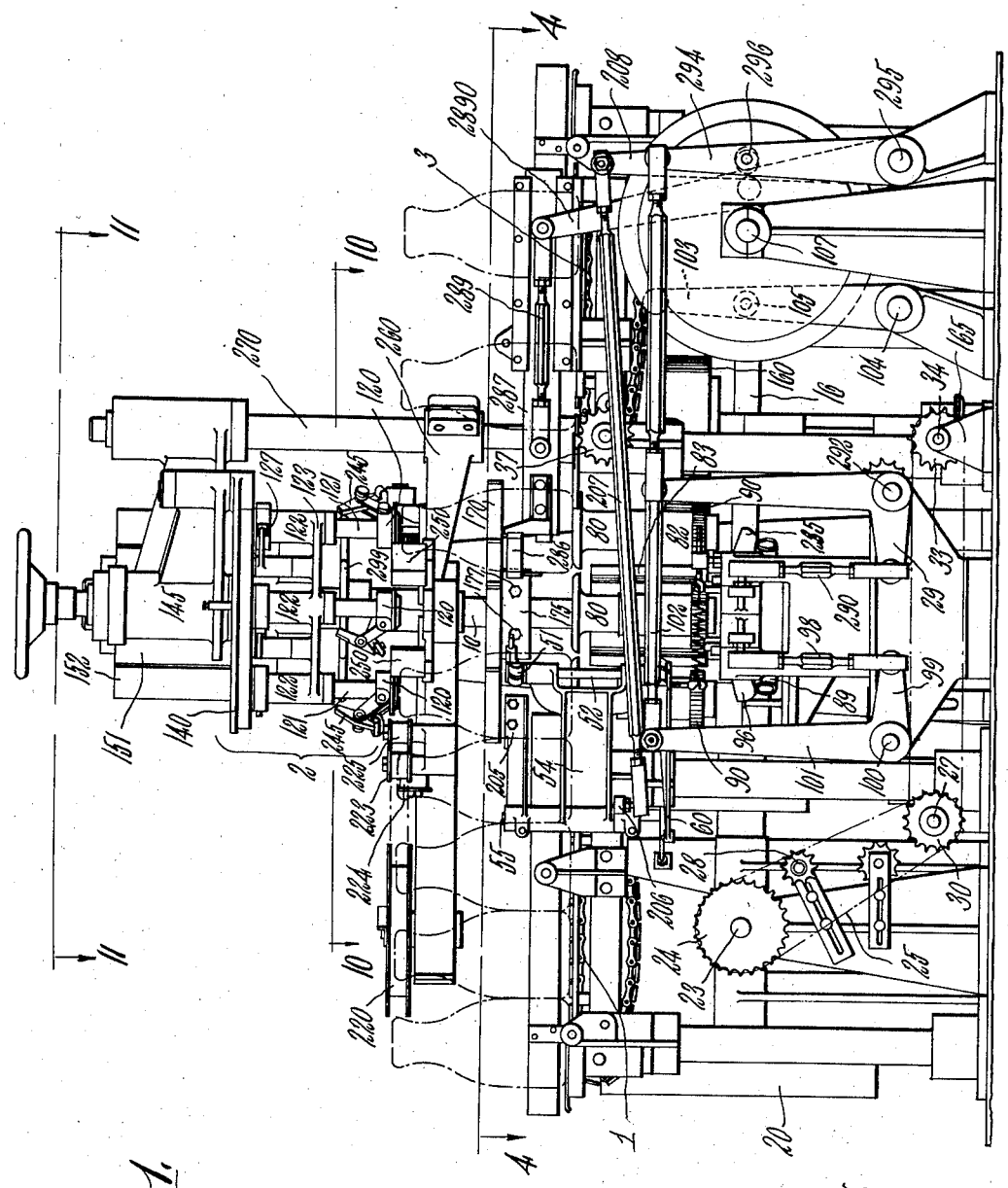

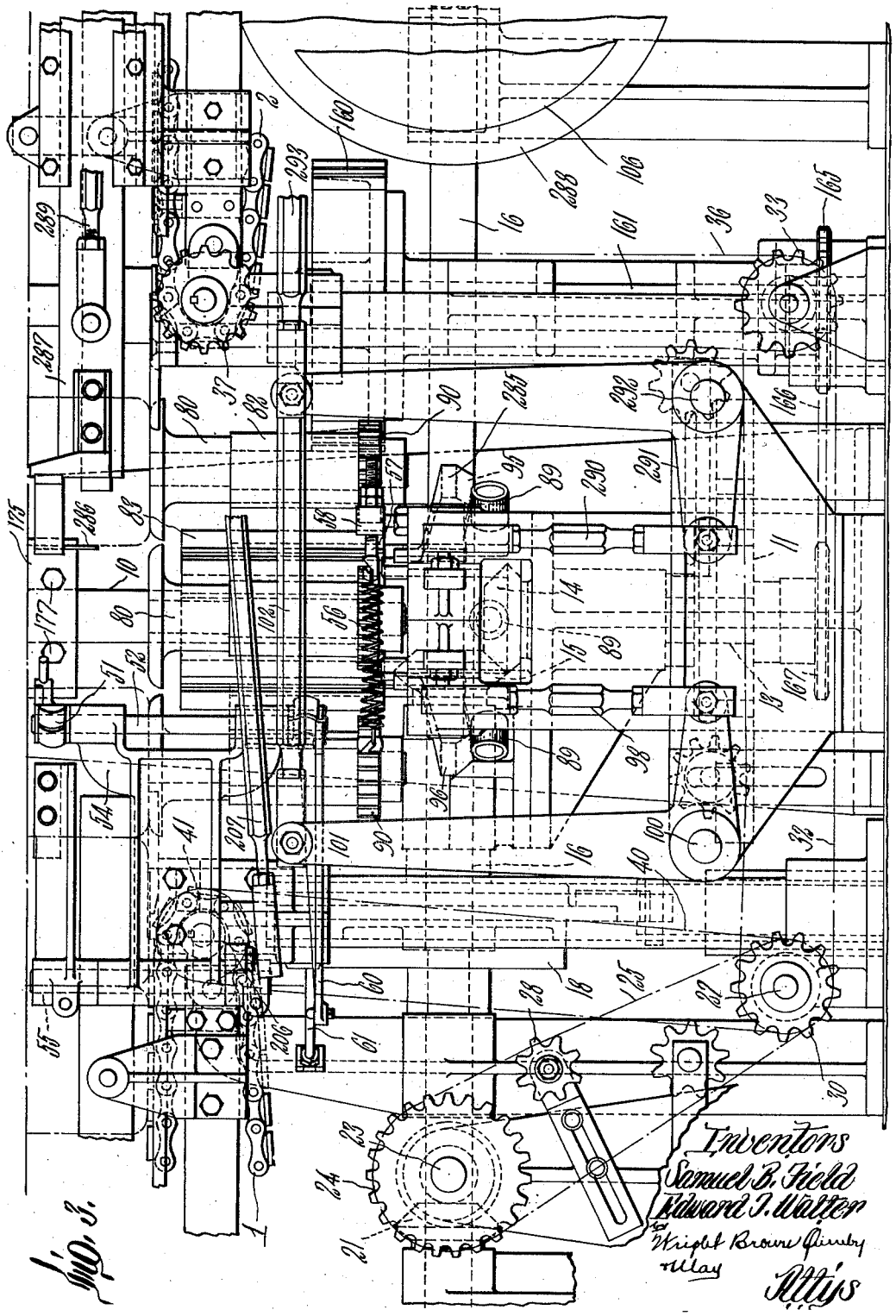

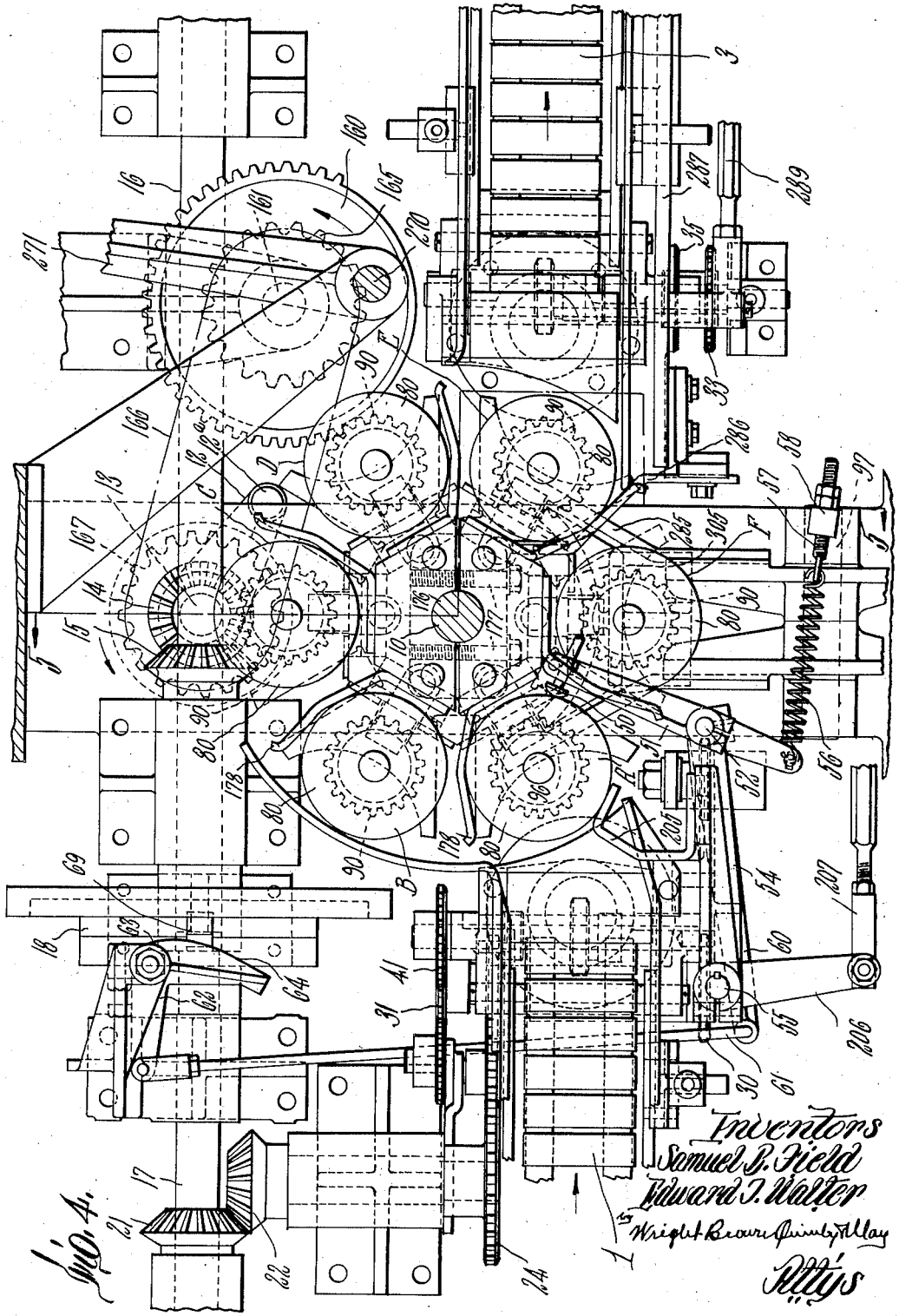

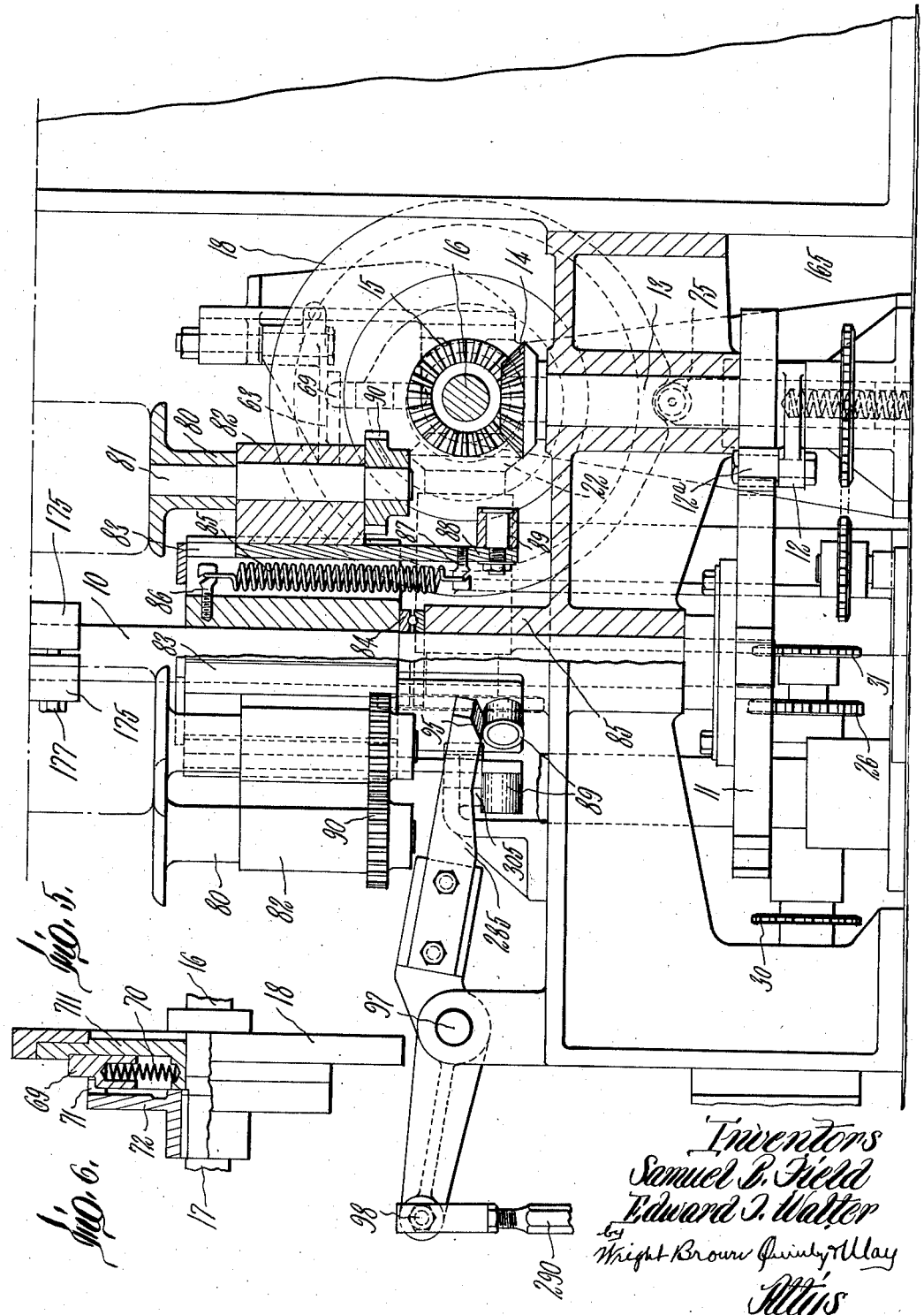

May 2, 1939.  S. B. FIELD ET AL  2,156,892
METHOD OF AND MACHINE FOR SEALING CAPPED CONTAINERS
Filed Nov. 14, 1936  10 Sheets-Sheet 6
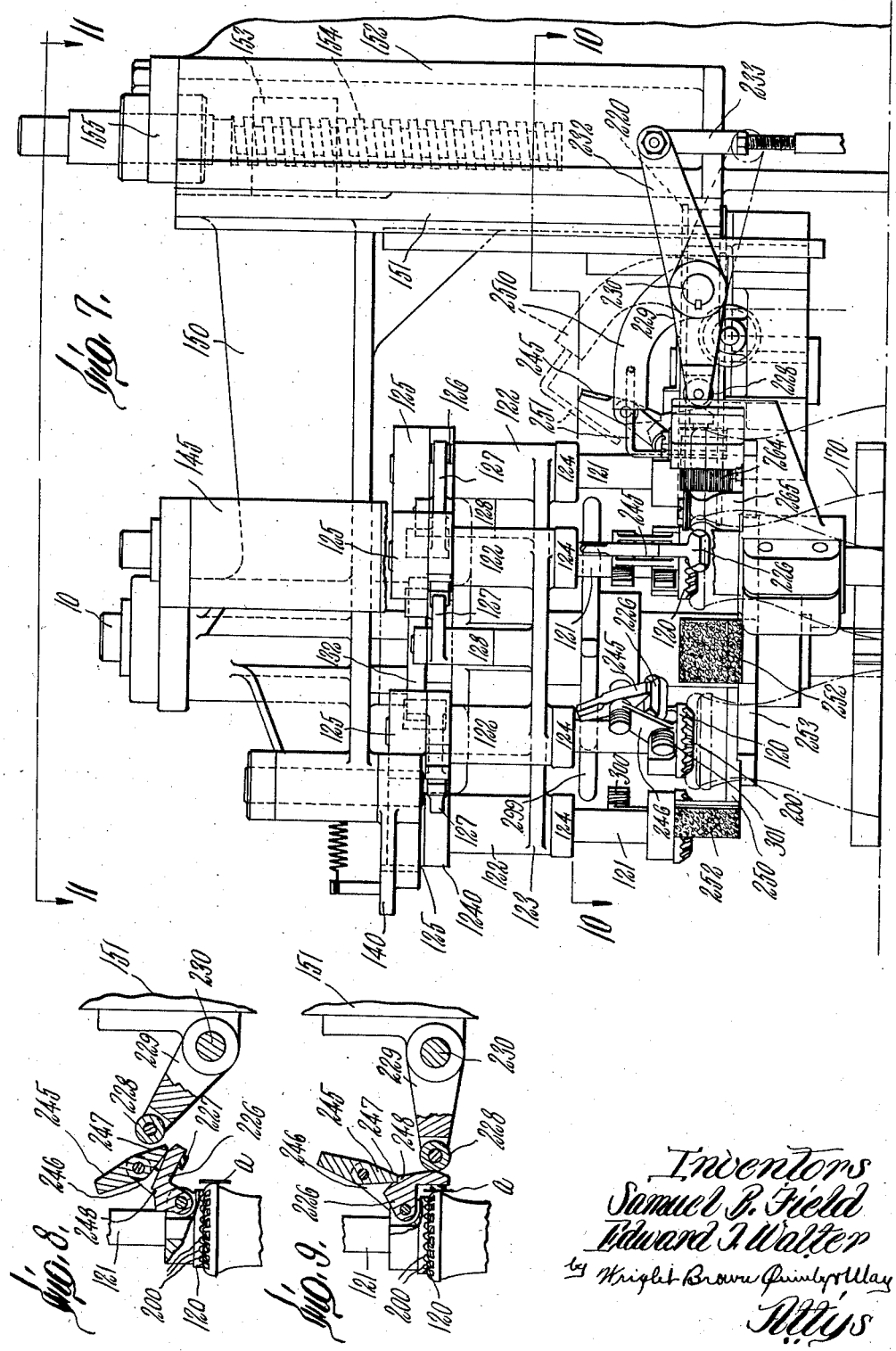

May 2, 1939. S. B. FIELD ET AL 2,156,892
METHOD OF AND MACHINE FOR SEALING CAPPED CONTAINERS
Filed Nov. 14, 1936 10 Sheets-Sheet 7

Inventors
Samuel B. Field
Edward J. Walter
by Wright, Brown, Quinby & May
Attys

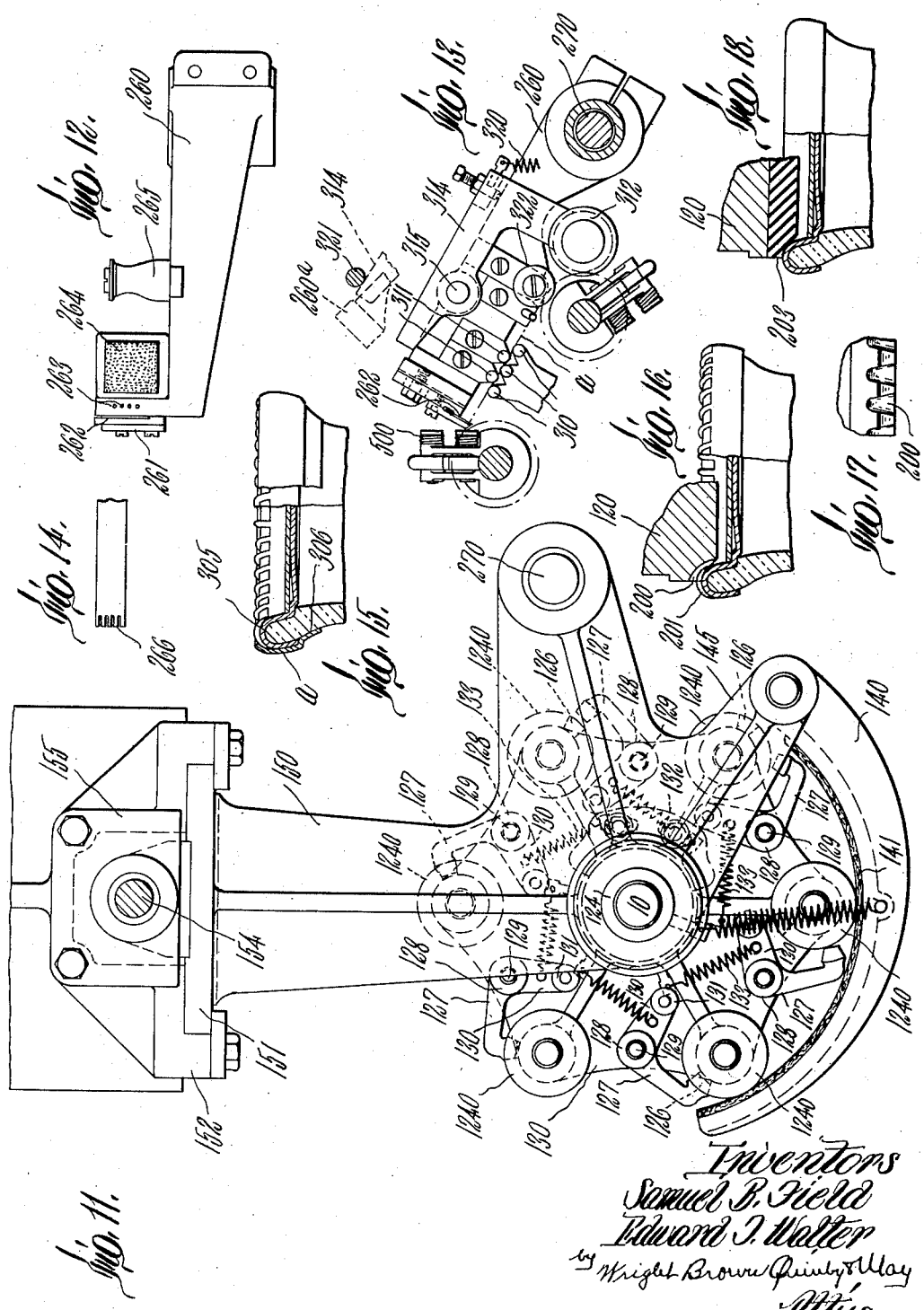

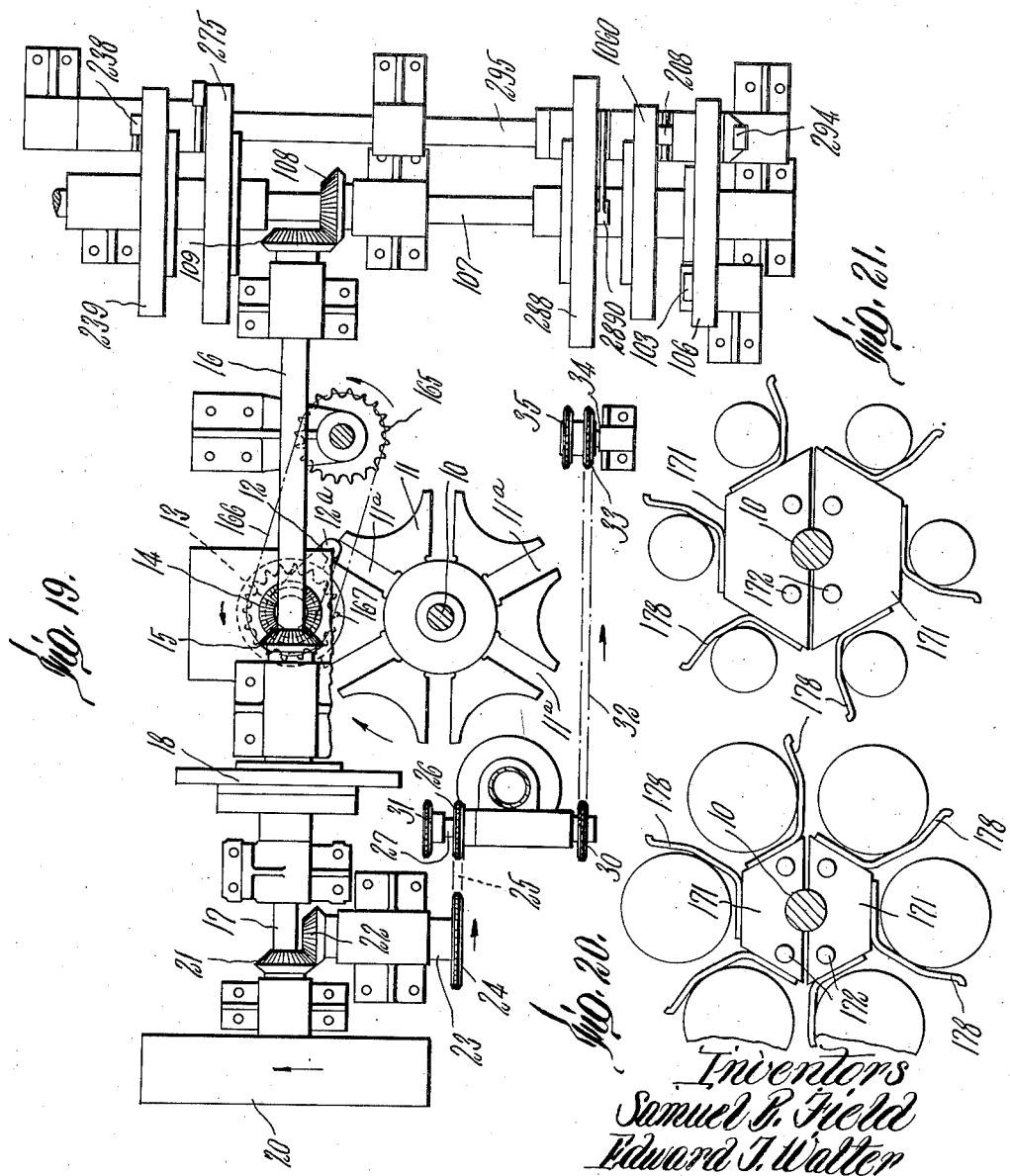

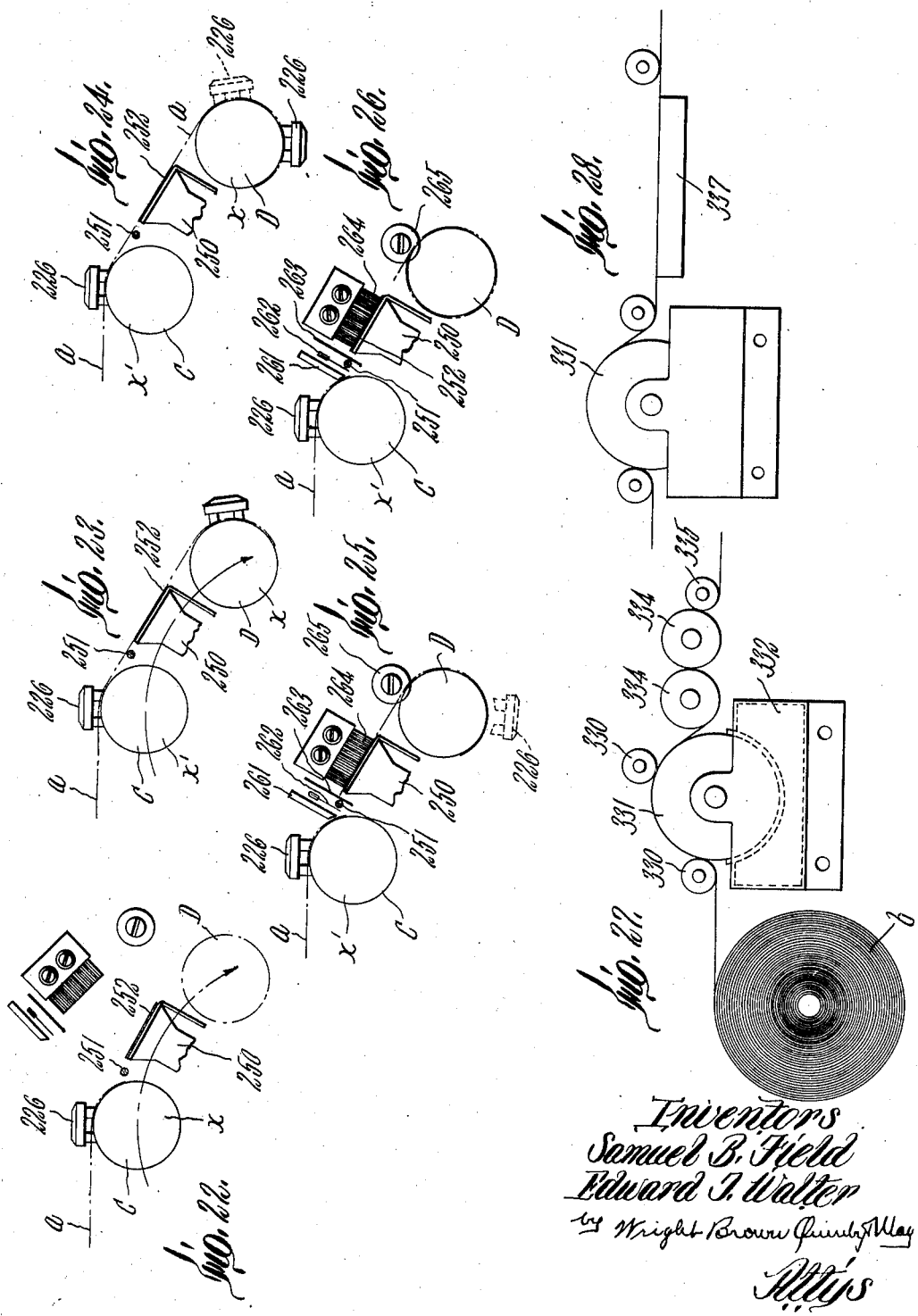

Patented May 2, 1939

2,156,892

UNITED STATES PATENT OFFICE 2,156,892

METHOD OF AND MACHINE FOR SEALING CAPPED CONTAINERS

Samuel B. Field, Holbrook, and Edward T. Walter, Quincy, Mass., assignors to American Seal-Kap Corporation of Delaware, Long Island City, N. Y., a corporation of Delaware Application November 14, 1936, Serial No. 110,804

31 Claims. (Cl. 216—29)

This invention relates to the sealing of containers to which caps have been applied. Among the purposes of such sealing may be mentioned the more complete protection of the contents of the containers from the possibility of contamination and the prevention of unauthorized tampering with such contents, the sealing showing by its mutilation any attempt to obtain access to such contents. While in its broader aspects, this invention is not limited to the sealing of any particular type of capped containers, it has been developed more particularly to suit the exacting requirements of the sealing of capped milk and cream bottles, or the like, and it will be more particularly described with reference to such containers, although reference to the sealing of other containers will be made at certain times.

A well known type of cap employed for capping milk and cream bottles is known to the trade as "Seal-Kap", such a cap being shown in the Baum Patent No. 1,668,349, granted May 1, 1928. In general, it may be described as having a central part which covers the mouth of the bottle and a marginal skirt portion which engages the outside of the pouring lip of the bottle.

The sealing of a bottle so capped, in accordance with this invention, comprises the winding of a suitable strip of sealing material around the top of the bottle in overlapping relation to the lower edge of the cap skirt and the outside of the bottle therebeneath, the ends of the strip being sealed together to form a continuous sealing ring conforming to the contours of the parts about which it is wound and sealing the cap to the bottle. Such sealing material may be of rubber, or rubber composition, or other suitable sheet material.

In accordance with this invention, therefore, the sealing material in strip form is fed to the capped bottles and wound around each in turn under such tension that the material is caused to conform to the configuration of the bottle and cap overlaid thereby, and is sealed to itself in overlapping relation when the winding has been completed.

For a more complete understanding of this invention, reference may be had to the accompanying drawings, in which—

Figure 1 is a front elevation of a machine for sealing milk and cream bottles.

Figure 2 is a perspective view looking at the rear of the machine.

Figure 3 is a view similar to a portion of Figure 1, but to a larger scale and showing certain parts by dotted lines.

Figure 4 is a detail section on line 4—4 of Figure 1.

Figure 5 is a detail section on line 5—5 of Figure 4.

Figure 6 is a detail partly in section of a one-revolution clutch mechanism.

Figure 7 is a fragmentary right end elevation of the machine.

Figures 8 and 9 are details partly broken away and in section showing the sealing strip clamp in open and closed positions, respectively.

Figure 11 is a detail horizontal section on line 11—11 of Figures 1 and 7.

Figure 12 is a fragmentary elevation of a part shown in Figure 10.

Figure 13 is a view similar to a portion of Figure 11, but showing a modified construction.

Figure 14 is a detail showing the sealing end of a strip of the sealing material.

Figure 15 is a fragmentary view partly in side elevation and partly in section of the top portion of a capped milk bottle as sealed by the machine.

Figure 16 is a view similar to Figure 15, but before the sealing has been effected and showing the engagement of the top clamping member with the bottle cap.

Figure 17 is a fragmentary side elevation of the cap-engaging portion of the clamping member.

Figure 18 is a view similar to Figure 16, but showing a modification.

Figure 19 is a somewhat diagrammatic view showing certain of the machine driving connections.

Figures 20 and 21 are fragmentary views similar to a portion of Figure 4 and showing arrangements for feeding bottles of different sizes to the sealing mechanism.

Figure 10:
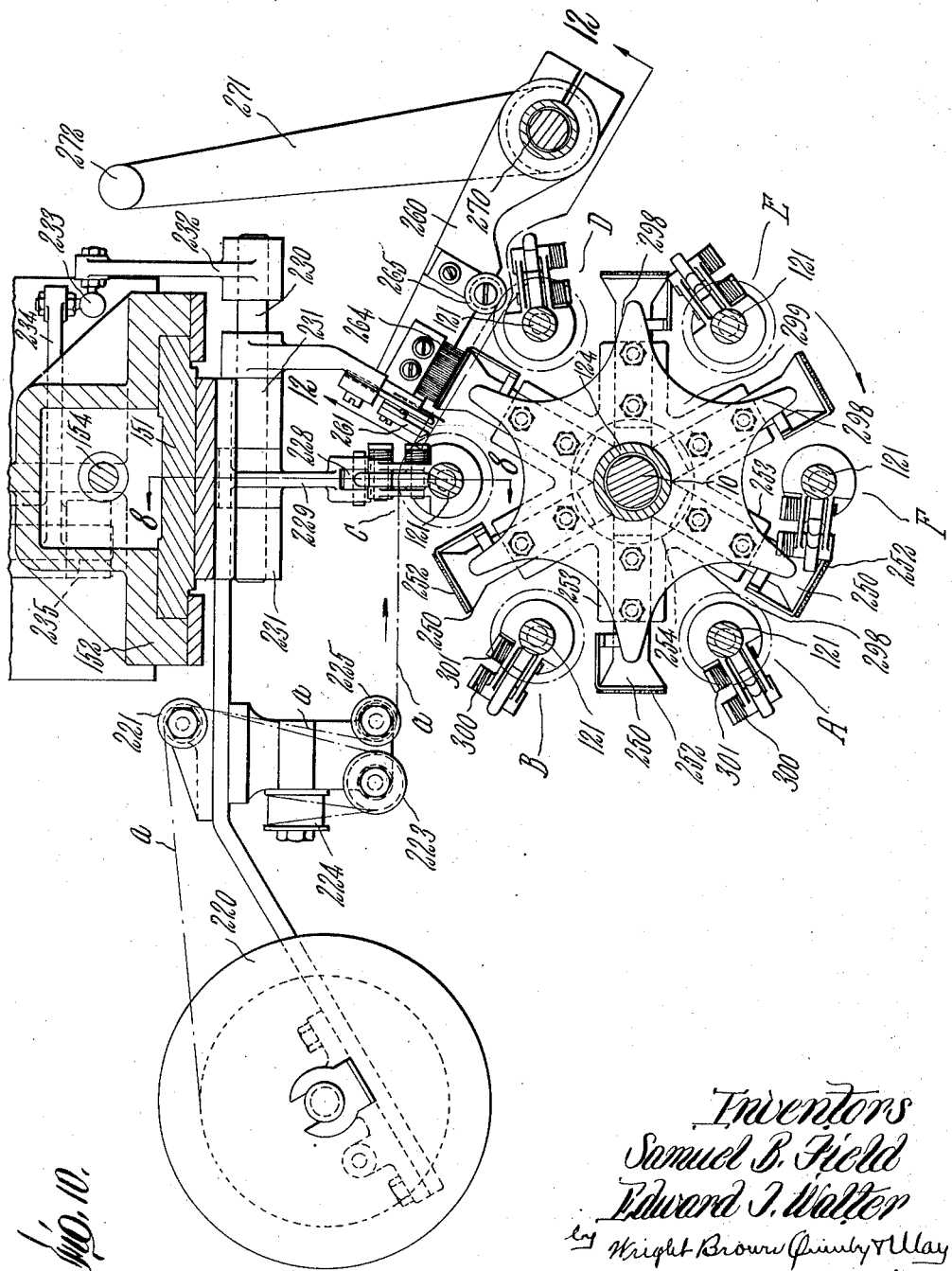
Figure 10 is a horizontal section on line 10—10 of Figures 1 and 7.

Figures 22 to 26, inclusive, are somewhat diagrammatic views showing successive stages in the wrapping and sealing operation.

Figures 27 and 28 are diagrammatic views showing different mechanisms which may be used to effect a preliminary treatment to the sealing strip where the character of the strip renders such treatment necessary or desirable.

Referring first to Figures 1, 2 and 4, the machine may be divided into three general parts: first, a means for conveying the capped containers or bottles to the sealing-strip-applying and winding mechanism; second, this sealing strip-applying-winding mechanism, and third, mechanism for feeding the capped and sealed containers away from the sealing-strip-applying and winding mechanism, these parts being designated generally by the numerals 1, 2 and 3, respectively. As shown, the parts 1 and 3 comprise belt conveyors, though any other suitable means might be substituted therefor.

The sealing strip-applying and winding mechanism comprises a carrier shown as a rotary turret having a plurality of stations, herein shown as six, to which the capped containers are fed in succession, and which are rotated to bring them successively into various angular positions where the various necessary operations are performed thereon. This turret mechanism is provided with a central vertical shaft 10 having attached thereto near its lower end, a Geneva wheel 11 (best shown in Figures 5 and 19). This Geneva wheel is rotated step by step to index the turret, this being accomplished by a crank arm 12 having a follower 12a which rides in the radial slots 11a of the Geneva wheel. This crank arm 12 is carried by a vertical shaft 13 having a bevel gear 14 (see Figure 5) at its upper end with which meshes a bevel gear 15 on a horizontal shaft 16. This horizontal shaft 16 is in alinement with a main drive shaft 17 to which it is connected by a one-revolution clutch mechanism shown at 18 and in detail in Figure 6.

The shaft 17 is provided with a main drive pulley 20 thereon and from this drive shaft, connections are made to continuously drive the conveyor mechanisms 1 and 2. As shown best in Figures 2, 3, and 19, the shaft 17 carries a bevel gear 21 which meshes with a bevel gear 22 on a horizontal shaft 23. The forward end of the shaft 23 carries a sprocket wheel 24 over which passes a chain 25 to a sprocket wheel 26 on a horizontal shaft 27. A suitable chain tension adjustment comprising an adjustable idler 28 (see Figure 3) may be employed. The shaft 27 is provided with a pair of sprocket wheels 30 and 31 at opposite ends. The sprocket wheel 30 is connected through a chain 32 with a sprocket wheel 33 on a horizontal shaft 34. This shaft 34 also carries another sprocket wheel 35 over which passes a chain 36 leading to a drive sprocket 37 for driving the conveyor 2. A chain 40 passing about the sprocket wheel 31 also passes about a sprocket wheel 41 for driving the conveyor 1. The conveyors are thus driven continuously during rotation of the main drive shaft 17, but the turret indexing mechanism and the strip-applying and winding mechanism are controlled by the one-revolution clutch 18. This, in turn, is controlled by the presence of a bottle in position in the turret mechanism in the first station A. This is accomplished, as shown in Figure 4, by the pressure of the container against a button member 50 carried by a lever 51. This lever is fixed to a fulcrum shaft 52 on a frame member 54, pivoted to swing on a vertical pivot 55, and the button 50 is normally held pressed to the left, as by means of a spring 56 engaging its outer end, and held in position by an adjustable anchor hook 57 threaded into a bracket member 58. To the shaft 52 is secured one end of an arm 60, which is connected through a link 61 with a bell crank lever 62, one arm 63 of which is formed with a cam face 64. This cam face is positioned to coact with a coupling pin 69 (see Figure 6) of the one-revolution clutch mechanism 18 to force this pin inwardly against the pressure of a spring 70 out of a slot 71 in the driven member 72 of this clutch mechanism so as to release the disk 711 from driving connection with the member 72. The member 72 is fixed to the drive shaft 17, while the disk 711 is fixed to the shaft 16. When the cam 64 is in the position shown in Figure 4, the member 69 is permitted to remain in its outer position so that the parts are clutched, but when a bottle is not in position at station A, the spring 56 holds the cam 64 in inoperative position where the member 69 is pressed inwardly, disconnecting the parts 711 and 72 at a definite relative angular position determined by the engagement in a groove of a spring pressed detent roller 75 (see Figure 5).

The bottles, when in the turret mechanism, are supported by bottle supports 80 each having a head at its upper end on which the bottle rests. Each of these supports 80 is fixed to a shaft 81 journaled in a bearing 82 supported in a spider 83 fixed to the vertical shaft 10. As shown in Figure 5, this spider 83 is supported on a thrust roller bearing at 84 on a fixed bearing boss 85 through which the shaft 10 extends. Each of the supports 80 is urged upwardly as by means of a spring 85, the upper end of which is supported by a hook 86 engaging the spider, and the lower end of which is engaged with a hook 87 secured to a bar 88 fixed to each of the bearings 80. On the lower end of each bar 88 is journaled a cam follower roll 89 by which each individual member 88 with its support 80 may be held in a depressed position. Beneath the bearing 82, each of the bottle support shafts 81 carries a gear 90 by which the bottle support may be rotated at suitable times.

At the station A, when in position to receive a bottle, the bottle support is in its lowered position, its roller 89 having ridden in beneath an inclined face portion 95 of a depresser lever 96 (see Figure 5) fulcrumed at 97 on a fixed supporting bracket. The outer end of this lever 96 has connected thereto a link 98, the lower end of which is connected, as shown in Figure 1, with a bell crank lever 99 fulcrumed at 100. The opposite arm 101 of this bell crank lever is connected through a link 102 with a cam follower lever 103 fulcrumed on the shaft 104, and having a cam follower roll 105 which cooperates with a cam groove in a rotary cam disk 106. As shown in Figure 19, this cam disk 106 is secured to a horizontal shaft 107 which is connected through intermeshing bevel gears 108 and 109 with the shaft 16, so that this cam is also under the control of the one-revolution clutch 18. The parts are so timed that just after the capped bottle has entered station A from the conveyor 1, the shaft 16 starts to rotate, and then the cam disk 106 is so turned as to pull downwardly on the outer end of the lever 96, thus raising its inner end and permitting the bottle to be lifted by the spring 85 of the corresponding bottle support to bring the top of the bottle with its cap against a top clamp 120. There is one of these top clamps for each bottle support. Each of these clamps is carried at the lower end of a rotary shaft 121 which is journaled in a bearing 122 in a spider 123. This spider is carried by a sleeve 124 which is keyed for rotation with the shaft 10, but is vertically adjustable thereon.

Each of the shafts 121 has fixed thereto a thrust collar 124 beneath its bearing 123, and above the bearing 123, it carries a pair of collars 1240 and 125. Each of the collars 1240 is provided with a notch 126 (see Figure 11) in which may be engaged at suitable times a latch finger 127 in order to hold the corresponding shaft 121 against rotation. Each of these latch fingers 127 is positioned at the outer end of one arm of a bell crank lever 128, each bell crank lever being pivoted as at 129 on the spider 123 carried by the sleeve 124.

The opposite arm 130 of each of these bell crank levers 128 is provided with a cam roller 131, which at a suitable angular position rides upon the edge of a cam member 132 and holds the corresponding latch out of latching position, as shown at the right hand portion of Figure 11, while when the cam roller 131 rides off from this cam, the latch is moved toward latching position, as by a spring 133, so that when the corresponding shaft 121 reaches the proper angular position, the latch member may snap into position in its groove and stop the rotation of the shaft 121 in a definite angular position.

In order to insure sufficient rotation of the shaft 121 to bring the slot into locking relation to the latch, a pivotal arm 140 is provided, which has a face concentric with the axis of the shaft 10, and preferably provided with a friction lining 141. This is positioned to engage the collar 125 so that as the turret is indexed, it drives the collar 125 frictionally to an extent sufficient to bring the latching notch into proper relation to the latch member. As soon as this latch member engages in the notch, the arm 140 is ineffective to turn it further, the collar 125 merely sliding along the lining 141. Thus the shaft 121 is rocked to a definite angular position during a portion of the indexing motion of the turret for a purpose which will later appear. Both the arm 140 and the cam 132 are carried by a non-rotatable head 145 journaled on, but axially fixed, with relation to the shaft 10. This head 145 is provided with an arm 150 having a slide 151 at its outer end, this slide being mounted in ways in a vertical bracket 152 forming part of the machine frame. It is adjustable vertically in these ways and for this purpose it is provided with a threaded extension 153 through which passes an adjusting screw 154 mounted for rotation but held against axial motion in a cap member 155 of the bracket 152. By these means the head 145 and the spider 123 with the parts carried thereby is vertically adjustable to suit the lengths of the bottles or other containers which are being operated upon.

Each of the top clamps 120 is formed to cooperate with the support 80 therebeneath to clamp the bottle or other container thereto, and at suitable times in the operation of the machine, this organization comprising the bottle support, the bottle, and the top clamp are rotated for a purpose which will later appear. This rotation is produced, as shown, by means of a mutilated gear 160 (see Figures 1, 2, 3 and 4) which is carried on the upper end of a vertical shaft 161, this gear being arranged to mesh in turn with each of the gears 90 carried by the bottle support shafts 81. Fixed to the lower end of the shaft 161 is a sprocket wheel 165 about which engages a sprocket chain 166. This sprocket chain also passes around a sprocket wheel 167 fixed to the shaft 13 so that the gear 160 is driven from this shaft.

Between each of the bottle supports and the top clamp is shown positioned a guide 170. In order that adjustment may be made for different diameters of containers, this guide may be made in a plurality of sizes, the proper one for the particular bottles to be sealed being assembled on the machine. Two sizes of such guide member are shown in Figures 20 and 21. As shown the guide member is formed in two sections 171 which may be assembled on opposite sides of the shaft 10, each section being provided with holes which may be engaged over pins 172 projecting from the top face of a two-part clamp collar 175 (see Figure 1), the two parts of which may be bolted together in clamped relation to the shaft 10 as at 176 (see Figure 4) by bolts 177. Each of the sections 171 is provided with an outwardly extended guide finger 178 against which the container may bear during the passage of the container around with the turret from station to station. These fingers help to definitely locate the bottles so that they may be in proper position for cooperation with the seal-applying mechanism as will be described. As some of this mechanism is operated by the rotation of the shafts 121 which carry the upper clamp members, these clamp members should be so formed as to be rotated through their engagement with the bottles, since the rotation of these bottles is produced by rotation of their supports. Where the caps for closing the containers are provided with radial corrugations in accordance with the disclosure of the Baum patent, to which reference has heretofore been made, the lower faces of the clamps 120 may be provided with mating fluted surfaces, as shown, for example, in Figures 7, 8, 9, 16 and 17, being provided with recesses 200 to receive the ribs 201 of the caps. Where the caps are not so ribbed, the lower faces of the clamps 120 may be provided with friction material such as rubber, or the like, as shown at 203 in Figure 18.

Assuming now that a bottle has been placed on the bottle support at the station A, and that the shaft 17 is being rotated, the one-revolution clutch is closed by the pressure of the bottle against the starting button 50. This starts the turning of the shafts 16 and 107, which through the cam 106, releases the bottle support at station A, and permits the spring to draw it up into clamping relation to its upper clamping member 120. It also starts the indexing mechanism so that at the proper time after the bottle has been so clamped between its support and the upper clamping member, the parts are moved bodily to the succeeding station B. When this is done a stop member 205 (see Figure 4), which in the position shown in this figure, extends in between upper and lower portions of the frame member 54 and prevents the passage of bottles from the conveyor 1 to the turret mechanism, and which is carried by the frame 60, is removed from stopping position by the rocking of this frame through an arm 206, a link 207 pivoted thereto and to a follower-carrying lever 208 fulcrumed at 295, its follower riding in a cam groove in the cam member 106a, thus to permit the conveyor 1 to feed another capped bottle onto the succeeding bottle support now occupying the loading position A, this successively placed bottle acting to maintain the one-revolution clutch mechanism closed.

The sealing material a may be taken from a supply reel 220 (shown best in Figures 1, 2 and 10) and may be led therefrom about a guide roller 221, and if it is received from the manufacturer with a strip of paper, or the like, to hold successive convolutions of the roll 220 from sticking together, the paper, or the like, is led off around rolls 223, 224 to waste, while the sealing material strip is separated therefrom and led about a guide 255. As shown best in Figure 10, this sealing strip reaches a position to be attached to the bottles at the station C where it extends along the side of the bottle top in overlapping relation to the cap margin and the bottle, as shown in Figures 8 and 9. Each of the top clamps 120, as shown in these figures, has pivoted thereto in a slot, a clamping arm or finger 226 provided with a strip-engaging pad, which may be of felt, rubber, or the like, as at 227. The bottle and its clamp 120 then being in locked angular position, the arm 226, when the bottle reaches the station C, is in position to be contacted by a roll 228, journaled at the outer end of an arm 229, carried by a rock shaft 230. As this rock shaft is moved from the position shown in Figure 8 to that of Figure 9, the clamp arm 226 is lowered to bring its pad 227 into the position shown in Figure 9, to clamp the strip a against the bottle. The arm 229 having moved the clamp arm 226 to clamping position, it is there held by a latch 245 pivoted to an arm 246 extending from the clamping head 120 and having an end portion 247 which drops into a notch 248 of the clamp arm 226, as shown in Figure 9. The arm 229 having thus performed its function, is rocked back to the position shown in Figure 8. The parts are then in the position shown in Figure 22, the bottle at the station C being indicated at x. This rock shaft 230 is mounted in bearings 231, as shown in Figure 10, secured to the slide 151, and it is arranged to be rocked through a rocker arm 232 attached thereto and a pivoted link 233 connected to a second arm 234 mounted to rock in a plane at right angles to the arm 232 and carried by a shaft 235. As shown in Figure 2, the shaft 235 has fixed thereto an arm 236 which is connected through a link 237 to a follower arm 238 having a cam which rides in a cam groove on the forward face of a cam 239, which is also fixed to the shaft 107 (see Figure 19).

The bottle then passes from the station C to the station D, as shown in Figure 23, and the succeeding bottle x' moves into the station C, the sealing strip a being clamped thereto as described with relation to the bottle x. The stretch of the strip a lying between the bottles x and x' has been brought across a fixed abutment or anvil plate 250 and across the side of a pin 251, the purpose of which will later appear. This pin is carried by an arm 2510 fixed to the rock shaft 230. This anvil plate 250 is preferably surfaced with a hard felt, or the like, as at 252, to which the strip a of material will not adhere. As shown best in Figures 7 and 10, the several anvil plates 250 are secured to radial arms 253 of a plate 254 secured to the sleeve 124. When the bottle x reaches the station D, its support is in position for its gear 90 to be engaged by the teeth of the mutilated gear 160, which is continuously rotated, and as soon as this occurs the bottle is rotated, as shown in Figure 24, so that its clamp arm is brought from the dotted line position shown in this figure toward the full line position. This increases the length of the path between the clamp on the bottle x and the clamp on the bottle x', thus stretching the strip a and partially winding it about the bottle x, overlapping the lower edge of the cap skirt and the bottle, this stretching causing the strip to conform to the contours of the bottle and cap against which it is presented. At about the completion of this part of the rotary motion, an arm 260 (see Figures 10 and 12) carrying a finger 261, which presses the strip a against the bottle and cap x' in advance of its clamp arm 226, a cutting knife 262, a slitter 263, a brush 264 and a presser roll 265, is rocked forwardly into the position shown in Figures 10, 25 and 26. This arm is so rocked by the rocking of a vertical rock shaft 270 to which it is secured and which is also provided with an arm 271, having a follower 272 controlled by a cam 275, fixed to the shaft 107. The knife 262 cuts off the sealing tape a between the pin 251 and the anvil plate 252, and the finger 261 presses the starting end of the next length of tape against the bottle and cap x'. The slitter 263 has a plurality of points for piercing the strip so that as it is drawn forward, slitting of the sealing end of the strip takes place, as shown in Figure 14 at 266, which end is to be wound onto the bottle x, in order to increase the difficulty of unsealing without so mutilating the sealing strip that tampering will be easily detectable. Where the sealing strip is of such a nature that a very close and firm adhesion of the overlapping of the wound strip is effected by pressure, this slitter may be quite unnecessary and may be omitted, its function being merely to increase the difficulties of tampering with the contents of the bottle without detection. At about his time, also, the clamp finger 226 releases the tape, as shown in Figure 25, so that on continued rotation of the bottle by the action of the mutilated gear the trailing end of the strip is wound onto the bottle and overlaps the starting end. Release of the clamp finger 226 is produced by the latch 245 striking upon a cam surface 298 on a plate 299 carried by the sleeve 124 as the bottle rotates. This surface 298 (see Figure 10) is eccentric to the corresponding shaft 121. There is such a surface for each of these shafts. The latch 245 is normally pressed toward its locking position as by a coil spring 300 (Figure 7) and the finger 226 is urged to its normally open position shown in Figure 8, by a similar coil spring 301. The function of the brush 264 is merely to hold the strip up in position against the anvil plate 252 so that on continued turning of the bottle x, the unwound portion of the length of sealing tape may be presented thereto and wound thereagain. This brush 264 imparts a frictional drag across the width of the strip or tape so that it is held in proper position to be wound into smooth contact with the bottle. The roll 265, concaved to somewhat the contour of the parts against which the strip a is to engage, has for its purpose to press and iron the railing end of the strip against the bottle and cap and to bring this trailing end into close overlapping contact with the starting end, thereby to effect a sealing therebetween in so far as this may be done by the use of pressure.

After the mutilated gear 160 has rotated to the extent such that it can no longer function to rotate the bottle x, the portion where the teeth are omitted then being presented opposite to the gear 90 on the bottle support, the turret is indexed again to bring the bottle x to the station E. As the bottle x reaches the station E, a lever 285 beneath which the roller 89 passes, is actuated to depress the bottle support to bring it out of clamping relation with the top clamp member 120 and to substantially the level of the conveyor 2. An ejector finger 286, carried by a slide 287, is then moved by a cam 288 carried by the shaft 107 through a link 289 and a follower carrying lever 2890, also fulcrumed on the fulcrum shaft 295, to eject the sealed bottle from the turret and onto the conveyor 2 which carries it away. The arm 285 which depresses the bottle support is actuated through a link 290 pivoted to its rear end, this link being connected to the lower arm of a bell crank lever 291 fulcrumed at 292. The upper end of this bell crank lever 292 is connected through a link 293 with a follower lever 294 fulcrumed at 295, this lever 294 carrying a follower 296 controlled by a cam groove in the cam 106. As the bottle support, now carrying no bottle, is moved from the unloading station E through the station F and to the station A, its roll 89 rides beneath an arcuate hold-down member 305 which retains the bottle support in its lower position until it passes to the control of this lever 96 at station A which allows the bottle support to rise after a bottle has been placed thereon, as previously described.

The sealing of the bottle and cap is illustrated in Figure 15, in which the strip $a$ is shown as wound about the skirt portion 305 of the cap and the adjacent portion at 306 of the outside of the bottle, being conformed to the contours of these parts.

In Figure 13 is illustrated a modification in which in place of employing a brush and anvil plate for holding the cut end portion of the sealing strip in position, two series of staggered partly intermeshing pins or ribs 310 and 311 are employed, between which the strip $a$ passes in an undulating path. Likewise a suitably heated roll shown at 312 is employed for pressing the sealing strip after it has been wound on the bottle so that where the material is not self-sealing, except when heated, such heat is provided. This roll may well be electrically heated. It is shown as carried by a lever 314 fulcrumed at 315 on the arm 260$a$ and is normally held in pressing position as by the use of a spring 320. A fixed pin 321 may be employed, positiond to engage the rear end of the lever 314 when the arm 260$a$ is swung outwardly, so as to swing the heated roll away from the pressing roll 322 so that this roll will not become heated thereby during the idle position of the arm 260$a$.

In Figures 27 and 28 is illustrated a further modification which may be employed to advantage where the sealing strip is of a material which may shrink when dried. In order to apply the right amount of moisture, so that upon drying, the strip will be conformed with the desired tension to the container sealed, this strip material, as $b$, is led by guide rolls 330 in contact with the periphery of a roller 331 which dips beneath the surface of a moistening-liquid-containing tank 332. It then passes around drying rolls 334, which may be heated to drive off the moistening liquid to the desired extent, whereupon the material may pass around the guide roll 235 to the applying mechanism with the desired amount of moisture therein, so that it is applied promptly after the moisture content has been brought to the predetermined desired point. This treatment is applicable to such materials, as, for example, glassine paper which will shrink on drying after being wet with water.

In Figure 28 another method is shown for accomplishing the same result, the strip passing over the moistening roll 331 and then over a heated table 337 to dry it out to the desired extent. A sealing strip which is affected by water will, of course, not be suitable for use for sealing milk bottles, which, under normal conditions are subjected to icing operations after being sealed, as the moisture from such icing operations would adversely affect such sealing. However, for some types of containers which will not be subjected to water, this may be satisfactory.

From the foregoing description of certain embodiments of this invention, it should be evident to those skilled in the art that various other changes and modifications may be made without departing from the spirit or scope of this invention as defined by the appended claims.

We claim:

1. The method of sealing capped containers, which comprises supporting a pair of such containers to be successively sealed, in spaced relation with a strip of stretchable sealing material in engagement with both containers in position to bridge the lower edge of each cap and its container, rotating one of said containers with respect to the other in a direction to wind the strip therearound to thereby stretch the strip as it is being wound, cutting off the strip adjacent to the other container while continuing the rotation of said one container to complete the winding of said cut off portion therearound, and sealing the overlapped ends of said cut strip.

2. The method of sealing capped containers, which comprises supporting a pair of such containers to be successively sealed, in spaced relation with a strip of stretchable sealing material in engagement with both containers in position to bridge the lower edge of each cap and its container, rotating one of said containers with respect to the other in a direction to wind the strip therearound to thereby stretch the strip as it is being wound, cutting off the strip adjacent to the other container while continuing the rotation of said one container to complete the winding of said cut off portion therearound, and sealing the overlapped ends of said cut strip, then advancing said other container and a third capped container in spaced relation thereto and clamping the strip to said third container back of its end portion clamped to said other container, and then winding said strip onto said other container and cutting off and sealing it as previously described with reference to said one container.

3. The method of successively sealing capped containers, which comprises successively presenting a stretchable sealing strip into contact with a pair of such containers in overlapping relation to the edges of the respective caps, rotating the first of said containers while said strip is clamped back from its end to another of said containers to stretch and apply a length of said strip to said rotating container, and severing said strip adjacent to said other container while continuing the winding and sealing of said length on said rotating container, and then advancing said other container and a third unsealed container to form a pair therewith, and then rotating said other container and winding a length of sealing strip therearound in the manner in which the first container was rotated and sealed.

4. The method of sealing a capped container, which comprises holding an end portion of a stretchable sealing strip in overlapping relation to the cap and container, and, while fixedly holding said strip at a position spaced from said end, rotating said capped container to stretch and wrap said strip therearound, severing the strip, and then completing the winding of the length of strip material to the line of severance and sealing it in overlapping relation to said end portion.

5. The method of sealing a capped container, which comprises holding an end portion of a stretchable sealing strip in overlapping relation to the cap and container, and, while fixedly holding said strip at a position spaced from said end, rotating said capped container to stretch and wrap said strip therearound, severing the strip, and continuing the rotation of said capped container to complete the winding of the length of strip material to the severed portion and presenting it into overlapping relation to said end.

6. The method of sealing a capped container, which comprising holding an end portion of a stretchable self-sealing sealing strip in overlapping relation to the cap and container and, while fixedly holding said strip at a position spaced from said end, rotating said capped container to stretch and wrap said strip therearound, severing the strip, and continuing the rotation of said capped container to complete the winding of the length of strip material to the severed portion and presenting and pressing it in overlapping relation to said end to thereby seal the overlapped portions of said strip together.

7. The method of sealing a capped container, which comprises holding an end portion of a stretchable sealing strip in overlapping relation to the cap and container, and, while holding said strip spaced from said end, rotating said capped container to stretch and wrap said strip therearound, severing the strip and slitting the rear end of the strip adjacent to the line of severance, and then completing the winding of the length of strip material to the line of severance and sealing it, including the slit portion, in overlapping relation to said end portion.

8. A machine of the class described, comprising means for clamping a capped container, means for holding the end portion of a strip of stretchable sealing material in overlapping relation to said cap and container, means for engaging and fixedly holding said strip at a position spaced from said container, means for rotating said holding means and clamp while said strip is so engaged to stretch and wind said strip around said container and cap, means for then severing said strip adjacent to said engaging means while the rotation of said holding means and clamp continues, and means for pressing the severed end portion in overlapping relation to the starting end portion and for sealing the overlapped portions together.

9. A machine of the class described, comprising a movable carrier, a plurality of rotatable capped container supports carried by said carrier, a clamp for holding each container to its support, means for relatively moving each support and its cooperating clamp to clamp each container at one position of each carrier and release each container at another position of said carrier, means for holding a strip of stretchable sealing material against a container in overlapping relation to its cap while said container and cap are held clamped, means for rotating each container while said strip is held thereto and after said strip has been engaged with a following cap and container to stretch and wind said strip about said rotated container and cap, means for severing said strip between said containers and completing the winding of the severed length about said rotated container to seal its cap thereto, and means for ejecting the sealed and capped containers from said carrier when they have been released.

10. A machine of the class described, comprising a movable carrier, a plurality of rotatable capped container supports carried by said carrier, a clamp for holding each container to its support, means for relatively moving each support in its cooperating clamp to clamp each container at one position of each carrier and release each container at another position of said carrier, means for holding a strip of stretchable sealing material against a container in overlapping relation to its cap while said container and cap are held clamped, means for rotating each container while said strip is held thereto and after said strip has been engaged with a following cap and container to stretch and wind said strip about said rotated container and cap, means for severing said strip between said containers, means for holding the rear portion of the severed length in position to be guided into proper relation on the container and cap while their rotation continues to complete the winding of the severed length thereon with its rear end in overlapping and sealing relation to its forward end, and means for ejecting the containers capped and sealed from said carrier.

11. In combination, means for clamping near to its end a strip of flexible stretchable material in overlapping relation to the margin of a cap of a capped container, means for severing said strip at a distance from said clamping means, means for rotating said capped container to wind the severed strip therearound, and means for supporting the severed end portion of said strip as it is being wound in position to overlap the starting end portion of said strip.

12. In combination, means for clamping near to its end a strip of flexible stretchable material in overlapping relation to the margin of a cap of a capped container, means for severing said strip at a distance from said clamping means, means for rotating said capped container to wind the severed strip therearound, and means for supporting the severed end portion of said strip as it is being wound in position to overlap the starting end portion of said strip, said strip-supporting means comprising a plate across which said strip passes and a brush for holding said strip against said plate.

13. In combination, means for clamping near to its end a strip of flexible stretchable material in overlapping relation to the margin of a cap of a capped container, means for severing said strip at a distance from said clamping means, means for rotating said capped container to wind the severed strip therearound, means for supporting the severed end portion of said strip as it is being wound in position to overlap the starting end portion of said strip, and means for sealing the lapping ends of said length together.

14. In combination, means for clamping near to its end a strip of flexible stretchable material in overlapping relation to the margin of a cap of a capped container, means for severing said strip at a distance from said clamping means, means for rotating said capped container to wind the severed strip therearound, and means for supporting the severed end portion of said strip as it is being wound in position to overlap the starting end portion of said strip, said supporting means comprising a pair of series of elements between which said strip may be drawn, said elements being in staggered relation on opposite sides of said strip.

15. In combination, means for clamping near to its end a strip of flexible stretchable material in overlapping relation to the margin of a cap of a capped container, means for severing said strip at a distance from said clamping means, means for rotating said capped container to wind the severed strip therearound, means for supporting the severed end portion of said strip as it is being wound in position to overlap the starting end portion of said strip, and a roller having its face contoured to the general shape of the surface to which said strip is to be applied positioned to press and roll the severed end portion into overlapping relation to the starting end portion of said strip.

16. A machine of the class described, comprising a movable carrier, a plurality of rotatable container supports carried by said carrier to move therewith, a rotatable clamp carried by said carrier above each support, means for relatively moving each support and its clamp to clamp and release a capped container on said support, a finger rotatable with each clamp and movable to and from a position to hold a sealing strip against said container to cause wrapping of said strip therearound as said container is rotated, means effective, when a capped container reaches a predetermined position in the motion of said carrier wherein the leading end portion of said strip is held to said container and an intermediate portion of said strip is held to a following container, to rotate said first-mentioned container to stretch and wrap said strip therearound, means to cut said strip between said rotating container and said following container and to support the trailing end of said strip while the rotation continues, and means for actuating said fingers to release the forward end of each severed strip before the winding is complete to permit its trailing end to overlap its forward end.

17. A machine of the class described, comprising a movable carrier, a plurality of rotatable container supports carried by said carrier to move therewith, a rotatable clamp carried by said carrier above each support, means for relatively moving each support and its clamp to clamp and release a capped container on said support, a finger rotatable with each clamp and movable to and from a position to hold a sealing strip against said container to cause wrapping of said strip therearound as said container is rotated, means effective, when a capped container reaches a predetermined position in the motion of said carrier wherein the leading end portion of said strip is held to said container and an intermediate portion of said strip is held to a following container, to rotate said first-mentioned container to stretch and wrap said strip therearound, means to cut said strip between said rotating container and said following container and to support the trailing end of said strip while the rotation continues, means for actuating said fingers to release the forward end of each severed strip before the winding is complete to permit its trailing end to overlap its forward end, and means for insuring stopping of the rotation of each container support clamp and finger in such angular position as to cause subsequent closing of said finger to engage the starting end portion of a subsequently presented sealing strip with an unsealed container subsequently presented thereto.

18. A machine of the class described comprising a turret, means for indexing said turret, a plurality of rotary container supports carried by said turret, means for indexing said turret to bring said supports successively into several indexed positions, a top clamp for each support for clamping a capped container thereto, a finger for each top clamp, means acting at one station to present the end portion of a sealing tape to said container and cap in overlapping relation to said container and cap and to actuate said finger to hold said tape thereto, and means acting at a subsequent station to rotate said supporting clamp and container to stretch and wind the tape about said container and cap, and to release said finger and cut off said tape while said rotation continues to complete the wrapping of said container and cap in a length of said tape.

19. A machine of the class described comprising a turret, means for indexing said turret, a plurality of rotary container supports carried by said turret, means for indexing said turret to bring said supports successively into the several indexed positions, a top clamp for each support for clamping a capped container thereto, a finger for each top clamp, means acting at one station to present the end portion of a sealing tape to said container and cap in overlapping relation to said container and cap and to actuate said finger to hold said tape thereto, means acting at a subsequent station to rotate said supporting clamp and container to stretch and wind the tape about said container and cap, and to release said finger and cut off said tape while said rotation continues to complete the wrapping of said container and cap in a length of said tape, and friction drive means for rotating each clamp and finger after said wrapping has been completed to bring said finger into proper angular position to secure the forward end portion of a succeeding length of tape presented thereto.

20. Means for holding a trailing end of a length of tape to be wound about a container, which comprises a pair of elements between which said tape is drawn relatively arranged to impart a frictional drag across the width of said tape.

21. Means for holding a trailing end of a length of tape to be wound about a container, which means comprising a support across which said tape may pass, and a brush positioned to bear on said tape to hold said tape on said support.

22. Means for holding the trailing end of a length of tape to be wound about a container, which means comprises two sets of projecting ribs between which said tape may be drawn, the ribs of the sets being arranged in staggered and partly intermeshing relation to form an undulating path for the passage of said tape.

23. The method of sealing a capped container, which comprises saturating a sealing strip which shrinks on drying, drying the saturated strip to a predetermined amount short of dryness, and then promptly winding and securing said partially dried strip in sealing relation to said container.

24. The method of applying a flexible strip to a receptacle, comprising bringing the strip into contact with the side of the receptacle in the presence of an adhesive, pressing the strip thus contacting with the receptacle to the receptacle, moving the receptacle bodily in one direction to feed the strip longitudinally, holding the strip at a point remote from the receptacle, cutting the strip at a point rearwardly of the holding point, and then turning the receptacle upon its axis to wind the cut strip thereon.

25. The method of applying a flexible strip to a receptacle, comprising bringing the strip into contact with the side of the receptacle in the presence of an adhesive, pressing the strip thus contacting to the receptacle, moving the receptacle bodily in one direction while holding it against turning movement upon its axis to feed the strip longitudinally, holding the strip at a point remote from the receptacle, cutting the strip at a point rearwardly of the holding point, and then turning the receptacle upon its axis to wind the cut strip thereon while yieldingly opposing the movement of the strip toward the receptacle.

26. The method of applying a flexible strip to a receptacle, comprising bringing the strip into contact with the side of the receptacle in the presence of an adhesive, pressing the strip thus contacting to the receptacle, moving the receptacle bodily in one direction while holding it against turning movement upon its axis to feed the strip longitudinally, holding the strip at a point remote from the receptacle, cutting the strip after the holding action and at a point rearwardly of the same, then turning the receptacle upon its axis to wind the cut strip thereon while yieldingly opposing the winding action, and then subjecting the wound strip to an ironing action.

27. The method of applying a flexible strip to receptacles, comprising advancing a plurality of receptacles in succession to a contacting position while holding the same against turning movement upon their axes, guiding a flexible strip and effecting its contact with each receptacle as it is brought to the contacting position, pressing the contacting strip to the receptacle, advancing the receptacle from the contacting position for a substantial distance so that the flexible strip is supported for contact with the successive receptacle, then holding the strip at a point remote from the advanced receptacle, then cutting the strip after the holding action and at a point rearwardly of the holding point, then turning the advanced receptacle to wind the cut strip thereon while yieldingly opposing the winding action, releasing the pressure supplied to the strip and completing the winding action, and then subjecting the completely wound strip to an ironing action.

28. In the method of applying a flexible strip to a receptacle, the steps of supporting a flexible strip and pressing the leading end of the flexible strip into contact with the side of the receptacle and continuing such pressing action while turning the receptacle for a portion of a revolution to wind the strip around the receptacle, gripping the strip and yieldingly opposing its paying out movement during the winding action, and cutting the strip after the gripping action and before the completion of the winding action.

29. In a machine for applying a strip or tape to a receptacle, means to hold and advance the receptacle, spaced devices to support the strip in the path of travel of the advancing receptacle, means to turn the receptacle upon its axis when the receptacle is brought into contact with the strip, and means to cut the strip between the devices.

30. In a machine for applying a strip or tape to receptacles, means to hold and advance the receptacles so that each receptacle is brought in succession to a strip contacting position, spaced devices for supporting the strip in the path of travel of each receptacle when the receptacle is brought to the strip contacting position, one device serving to press the strip to the preceeding receptacle, means to turn each receptacle upon its axis to wind the applied strip upon the same, and means to cut the strip between the devices.

31. In a machine for applying a strip or tape to receptacles, means to hold and advance the receptacles so that each receptacle is brought in succession to a strip contacting position, spaced devices for supporting the strip in the path of travel of each receptacle when such receptacle is brought to the strip contacting position, one device serving to press the strip to the preceeding receptacle, means to turn each receptacle upon its axis to wind the strip upon the same, means to cut the strip, yielding means to grip the strip, and means for effecting an ironing action upon the strip applied to the receptacle.

SAMUEL B. FIELD.
EDWARD T. WALTER.